(12) United States Patent
Gerst et al.

(10) Patent No.: US 6,730,729 B2
(45) Date of Patent: May 4, 2004

(54) HEAT CURABLE BINDERS

(75) Inventors: Matthias Gerst, Neustadt (DE); Matthias Laubender, Schifferstadt (DE); Bernd Reck, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 85 days.

(21) Appl. No.: 10/124,454

(22) Filed: Apr. 18, 2002

(65) Prior Publication Data
US 2003/0027915 A1 Feb. 6, 2003

(30) Foreign Application Priority Data
May 22, 2001 (DE) .......................................... 101 25 139

(51) Int. Cl.$^7$ ................................................. C08F 2/16
(52) U.S. Cl. ................. 524/460; 524/730; 524/602; 524/607; 524/766; 524/796; 106/644; 106/711; 106/797
(58) Field of Search ................. 524/460, 730, 524/602, 607, 766, 796; 106/644, 711, 797

(56) References Cited

U.S. PATENT DOCUMENTS

| | | | |
|---|---|---|---|
| 5,830,934 A | * | 11/1998 | Krishnan ..................... 524/43 |
| 6,071,994 A | | 6/2000 | Hummerich et al. |
| 6,099,771 A | | 8/2000 | Hudkins et al. |

FOREIGN PATENT DOCUMENTS

| | | |
|---|---|---|
| DE | 199 49 592 | 4/2001 |
| EP | 0 278 523 | 8/1988 |
| EP | 0 445 578 | 9/1991 |
| EP | 0 583 086 | 2/1994 |
| WO | WO 97/31036 | 8/1997 |
| WO | WO 97/31059 | 8/1997 |

* cited by examiner

*Primary Examiner*—William Cheung
(74) *Attorney, Agent, or Firm*—Oblon, Spivak, McClelland, Maier & Neustadt, P.C.

(57) ABSTRACT

The invention relates to a process for preparing an aqueous polymer dispersion comprising an emulsion polymer a polymer composed of at least 5% by weight of an ethylenically unsaturated monocarboxylic acid, dicarboxylic acid or dicarboxylic anhydride (acid polymer SP for short), and an alkoxysilane of the formula $$SiR^1R^2R^3R^4$$

in which the groups $R^1$ to $R^4$ independently of one another are each an organic radical with the proviso that at least one of the groups is an alkoxy group, which comprises preparing said emulsion polymer by emulsion polymerization in the presence of at least some of the alkoxysilane.

14 Claims, No Drawings

HEAT CURABLE BINDERS

The invention relates to a process for preparing an aqueous polymer dispersion comprising an emulsion polymer (EP for short)
a polymer composed of at least 5% by weight of an ethylenically unsaturated monocarboxylic acid, dicarboxylic acid or dicarboxylic anhydride (acid polymer SP for short), and
an alkoxysilane of the formula

$SiR^1R^2R^3R^4$ in which the groups $R^1$ to $R^4$ independently of one another are each an organic radical with the proviso that at least one of the groups is an alkoxy group, which comprises preparing said emulsion polymer by emulsion polymerization in the presence of at least some of the alkoxysilane.

The invention further relates to aqueous polymer dispersions obtainable by the process and the use of said dispersions as binders.

Heat curable binders made from polycarboxylic acids and polyols and/or alkanolamines are known, for example, from EP-A-445578, EP-A-583086, EP-A-882074, EP-A-882093 or DE-A-19949592 (OZ 50804).

In EP-A-882074 and DE-A-19949592, alkoxysilanes are among the possible additives mentioned for such binders.

It is an object of the present invention to improve further the performance properties of heat curable binders, and especially the strength of the moldings produced, as compared with their prior art counterparts. The binders ought at the same time to be obtainable by means of an extremely simple process.

We have found that this object is achieved by the above process and, respectively, by the binders obtainable by the process, and their use.

The emulsion polymer (EP) consists of at least 40% by weight, with particular preference at least 60% by weight, with very particular preference at least 80% by weight, of what are known as principal monomers.

The principal monomers are selected from $C_1$–$C_{20}$ alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of vinyl alcohols containing 1 to 10 carbon atoms, aliphatic hydrocarbons having from 2 to 8 carbon atoms and 1 or 2 double bonds, and mixtures of these monomers.

Examples include (meth)acrylic acid alkyl esters having a $C_1$–$C_{10}$ alkyl radical, such as methyl methacrylate, methyl acrylate, n-butyl acrylate, ethyl acrylate and 2-ethylhexyl acrylate.

Also suitable in particular are mixtures of the alkyl (meth)acrylates.

Examples of vinyl esters of carboxylic acids having from 1 to 20 carbon atoms are vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene and—preferably—styrene. Examples of nitrites are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers include vinyl methyl ether and vinyl isobutyl ether. Vinyl ethers of alcohols containing from 1 to 4 carbon atoms are preferred.

Hydrocarbons that may be mentioned, having from 2 to 8 carbon atoms and two olefinic double bonds, include butadiene, isoprene and chloroprene; those with one double bond include, for example, ethylene and propylene.

Preferred principal monomers are the $C_1$ to $C_{10}$ alkyl acrylates and methacrylates, especially $C_1$ to $C_8$ alkyl acrylates and methacrylates. Suitable compounds preferably also include mixtures of $C_1$–$C_{10}$ alkyl acrylates or $C_1$–$C_{10}$ alkyl methacrylates with vinylaromatics, especially styrene.

Very particular preference is given to methyl acrylate, methyl methacrylate, ethyl acrylate, n-butyl acrylate, n-hexyl acrylate, octyl acrylate, 2-ethylhexyl acrylate, styrene, and mixtures of these monomers.

Besides the principal monomers, the free-radically polymerized polymer may contain further monomers, e.g., monomers having carboxylic acid, sulfonic acid or phosphonic acid groups. Carboxylic acid groups are preferred. Examples that may be mentioned include acrylic acid, methacrylic acid, itaconic acid, maleic acid, and fumaric acid.

Examples of further monomers include hydroxyl-containing monomers, especially $C_1$–$C_{10}$ hydroxyalkyl (meth)acrylates, and (meth)acrylamide.

Further monomers that may be mentioned also include phenyloxyethyl glycol mono(meth)acrylate, glycidyl acrylate, glycidyl methacrylate, and amino (meth)acrylates such as 2-aminoethyl (meth)acrylate.

As further monomers, mention may also be made of crosslinking monomers.

Mention may also be made, further, of monomers containing hydrolyzable Si groups.

The fraction of monomers containing carboxylic acid groups or carboxylic anhydride groups is generally below 5% by weight, in particular below 3% by weight, based on EP.

EP is prepared by emulsion polymerization.

The emulsion polymerization is carried out using ionic and/or nonionic emulsifiers and/or protective colloids and/or stabilizers as surface-active compounds.

A detailed description of suitable protective colloids is given in Houben-Weyl, Methoden der organischen Chemie, volume XIV/1, Makromolekulare Stoffe, Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of the protective colloids, are usually below 2000 g/mol. Where mixtures of surface-active substances are used, the individual components must of course be compatible with one another, something which can be checked in case of doubt by means of a few preliminary tests. It is preferred to use anionic and nonionic emulsifiers as surface-active substances. Examples of customary accompanying emulsifiers are ethoxylated fatty alcohols (EO units: 3 to 50, alkyl: $C_8$ to $C_{36}$), ethoxylated mono-, di- and tri-alkylphenols (EO units: 3 to 50, alkyl: $C_4$ to $C_9$), alkali metal salts of dialkyl ester of sulfosuccinic acid and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Further suitable emulsifiers are compounds of the formula II

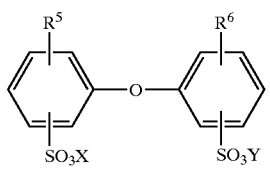

(II)

in which $R^5$ and $R^6$ are hydrogen or $C_4$ to $C_{14}$ alkyl but are not simultaneously hydrogen and X and Y may be alkali metal ions and/or ammonium ions. Preferably, $R^5$ and $R^6$ are linear or branched alkyl radicals having from 6 to 18 carbon atoms or hydrogen and in particular have 6, 12 or 16 carbon atoms, $R^5$ and $R^6$ not both simultaneously being hydrogen. X and Y are preferably sodium, potassium or ammonium ions, particular preference being given to sodium. Particularly advantageous compounds II are those in which X and Y are sodium, $R^5$ is a branched alkyl radical having 12 carbon atoms, and $R^6$ is hydrogen or $R^5$. Use is frequently made of technical-grade mixtures containing a fraction of from 50 to 90% by weight of the monoalkylated product, an example being Dowfax® 2A1 (trademark of Dow Chemical Company).

Suitable emulsifiers can also be found in Houben-Weyl, Methoden der organischen Chemie, volume 14/1, Makromolekulare Stoffe, Georg Thieme Verlag, Stuttgart, 1961, pages 192 to 208.

Examples of emulsifier trade names are Dowfax® 2A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL and Emulphor NPS 25.

The surface-active substance is normally used in amounts of from 0.1 to 10% weight, based on the monomers to be polymerized.

Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide.

Initiator systems known as reduction-oxidation (redox) systems are also suitable.

The redox initiator systems are composed of at least one, usually inorganic, reducing agent and an organic or inorganic oxidizing agent.

The oxidizing components comprise, for example, the emulsion polymerization initiators already mentioned above.

The reducing component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used together with soluble metal compounds whose metallic component is able to exist in a plurality of valence states.

Examples of customary redox initiator systems are ascorbic acid/iron(II) sulfate/sodium peroxodisulfate, tert-butyl hydroperoxide/sodium disulfite, and tert-butyl hydroperoxide/sodium hydroxymethanesulfinate. The individual components, the reducing component for example, may also be mixtures: for example, a mixture of the sodium salt of hydroxymethanesulfonic acid with sodium disulfite.

The compounds stated are generally used in the form of aqueous solutions, the lower concentration being determined by the amount of water that is acceptable in the dispersion and the upper concentration by the solubility of the respective compound in water. In general concentration is from 0.1 to 30% by weight, preferably from 0.5 to 20% by weight, with particular preference from 1.0 to 10% by weight, based on the solution.

The amount of initiators is generally from 0.1 to 10% by weight, preferably from 0.5 to 5% by weight, based on the monomers to be polymerized. It is also possible for two or more different initiators to be used for the emulsion polymerization.

During the polymerization it is possible to use regulators, in amounts, for example, of from 0 to 0.8 part by weight, per 100 parts by weight of the monomers to be polymerized. These regulators reduce the molar mass. Suitable examples include compounds containing a thiol group such as tert-butyl mercaptan, ethylhexyl thioglycolate, mercaptoethanol, mercaptopropyltrimethoxysilane, and tert-dodecyl mercaptan.

The emulsion polymerization takes place in general at from 30 to 130° C., preferably from 50 to 90° C. The polymerization medium may be composed either of water alone or of mixtures of water and water-miscible liquids such as methanol. It is preferred to use just water. The emulsion polymerization may be conducted either as a batch process or in the form of a feed process, including staged or gradient procedures. Preference is given to the feed process, in which a portion of the polymerization batch is introduced as an initial charge to the reaction vessel, heated to the polymerization temperature and then partly polymerized, after which the remainder of the polymerization batch is supplied to the polymerization zone normally by way of two or more spatially separate feed streams of which one or more contain the monomers in neat form or in emulsifying form, the monomers being supplied continuously, in stages, or under a concentration gradient, during which the polymerization is maintained. For the polymerization it was also possible to include a polymer seed in the initial charge for the purpose, for example, of better setting of the particle size.

The manner in which the initiator is added to the polymerization vessel in the course of the free-radical aqueous emulsion polymerization is known to the skilled worker. It may either be included in its entirety in the initial charge to the polymerization vessel or else used continuously or in stages at the rate at which it is consumed in the course of the free-radical aqueous emulsion polymerization. In each particular case this will depend both on the chemical nature of the initiator system and on the polymerization temperature. It is preferred to include one portion in the initial charge and to supply the remainder to the polymerization zone at the rate at which it is consumed.

In order to remove residual monomers, it is common to add initiator after the end of the emulsion polymerization proper as well, i.e., after a monomer conversion of at least 95%.

In the case of the feed process, the initial components may be added to the reactor from the top, through the side, or from below, through the reactor floor.

The emulsion polymerization provides aqueous polymer dispersions with solids contents of generally from 15 to 75% by weight, preferably from 40 to 75% by weight.

For a high space/time yield of the reactor, dispersions having a very high solids content are preferred. In order to be able to attain solids contents >60% by weight, a bimodal or polymodal particle size should be set, since otherwise the viscosity becomes too high and the dispersion can no longer be handled. Producing a new particle generation can be done, for example, by adding seed (EP 81083), by adding excess amounts of emulsifiers, or by adding miniemulsions. A further advantage associated with the low viscosity and high solids content are the improved coating characteristics at high solids contents. Producing (a) new particle generation(s) can be done at any desired point in time, guided by the particle size distribution that is aimed at for a low viscosity.

The polymer thus prepared is used preferably in the form of its aqueous dispersion.

The glass transition temperature of the polymeric binder, or of the emulsion polymer, is preferably from −60 to +110° C., with particular preference from −50 to +100° C., and with very particular preference from −40 to +100° C.

The glass transition temperature can be determined by customary methods such as differential thermal analysis or differential scanning calorimetry (see for example ASTM 3418/82, midpoint temperature).

Besides the emulsion polymer, the aqueous polymer dispersion comprises alkoxysilanes of the formula

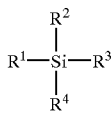

in which $R^1$ to $R^4$ independently of one another are organic radicals with the proviso that at least one of the groups $R^1$–$R^4$ is an alkoxy group, especially a $C_1$–$C_8$ alkoxy group, preferably a $C_1$–$C_4$ alkoxy group. With particular preference two, three or all of the groups $R^1$ to $R^4$ are an alkoxy group; with very particular preference, two or three, especially three, of the groups are an alkoxy group.

An especially preferred alkoxy group is the methoxy group. The other groups are other organic radicals, particular organic radicals each containing up to 10 carbon atoms with or without heteroatoms, such as O, N or S.

The groups may in particular be alkyl groups, preferably $C_1$–$C_8$ alkyl groups, with particular preference $C_1$–$C_4$ alkyl groups.

In accordance with the invention the emulsion polymerization of EP is conducted in the presence of at least some of the alkoxysilane.

The emulsion polymerization preferably takes place in the presence of at least 20% by weight, with particular preference at least 50% by weight, with very particular preference 100% by weight of the total amount of the alkoxysilane.

The alkoxysilane may be added to the aqueous emulsion of the monomers that are to be polymerized, before commencement of the emulsion polymerization. The alkoxysilane may also be added during the polymerization.

The addition of the above portion, or of the whole amount, is made preferably before 70% by weight, with particular preference 50% by weight, of the monomers of which EP is composed have undergone polymerization.

The amount of the alkoxysilane is preferably from 0.1 to 10 parts by weight, with particular preference from 0.2 to 5 parts by weight, per 100 parts by weight of the sum of EP+SP (solids).

The aqueous polymer dispersion further comprises the acid polymer SP defined at the outset.

SP is a free-radically polymerized polymer composed of from 5 to 100% by weight, preferably from 20 to 100% by weight, with particular preference from 40 to 100% by weight, of an ethylenically unsaturated acid or an ethylenically unsaturated acid anhydride.

Mention may be made in particular of acrylic acid or methacrylic acid, maleic acid, fumaric acid, itaconic acid, and maleic anhydride.

With particular preference SP contains acid anhydrides, e.g., maleic anhydride, or dicarboxylic acids which are able to form anhydrides, e.g., maleic acid.

In particular the polymers SP contain from 5 to 50% by weight, preferably from 10 to 40% by weight, of the last-mentioned dicarboxylic acids or acid anhydrides. The other ethylenically unsaturated compounds of which the polymer is composed preferably comprise acrylic or methacrylic acid.

The acids may also in principle be in the form of, and be used as, salts, e.g., alkali metal salts or ammonium salts. Amine salts are likewise suitable.

The polymer may further contain, for example, the following monomers as structural components:

$C_1$–$C_8$ alkyl (meth)acrylates, vinyl esters, vinyl ethers, olefins, vinyl halides, unsaturated nitriles, etc.

The aqueous polymer dispersion further preferably comprises a polyol as crosslinking agent for the polymer SP.

The compounds in question are preferably low molecular weight compounds having a molar weight of below 2000 g/mol, in particular below 1000 g/mol.

Preference is given to polyols having a functionality of from 2 to 5, such as glycerol, trimethylolpropane, etc.

Alkanolamines are particularly preferred. Mention may be made of diethanolamine and triethanolamine in particular.

Particularly suitable polymers SP are polymers as described in EP-A-882074.

SP and polyol crosslinker are used preferably in a ratio to one another which is such that the molar ratio of carboxyl groups and the hydroxyl groups is from 20:1 to 1:1, more preferably from 8:1 to 5:1, and with particular preference from 5:1 to 1.7:1 (for this purpose, anhydride groups are counted as 2 carboxyl groups).

The acid polymer and the polyol may be added to the aqueous dispersion at any point in time.

The aqueous polymer dispersion may comprise phosphorus-containing reaction accelerators; preferably, however, it contains no such compounds.

In one particular embodiment, the emulsion polymer is prepared in the presence of at least a portion of the acid polymer SP. In this case SP is preferably from 50 to 99.5% by weight of at least one ethylenically unsaturated monocarboxylic or dicarboxylic acid or adicarboxylic anhydride, from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group, up to 20% by weight of at least one further monomer.

With particular preference the emulsion polymerization takes place in the presence of at least 30% by weight, in particular at least 50% by weight, with very particular preference at least 100% by weight, of the total amount of SP.

The polymer SP contains, incorporated as structural elements, from 50 to 99.5% by weight, preferably from 70 to 99% by weight, of structural elements deriving from at least one ethylenically unsaturated monocarboxylic or dicarboxylic acid. Within the polymer, these acids may if desired also be present in whole or in part in the form of a salt. The acid form is preferred.

The solubility of SP in water is preferably more than 10 g/l (at 25° C.).

Preferred carboxylic acids are $C_3$ to $C_{10}$ monocarboxylic acids and $C_4$ to $C_8$ dicarboxylic acids, especially acrylic acid, methacrylic acid, crotonic acid, fumaric acid, maleic acid, 2-methylmaleic acid and/or itaconic acid. Acrylic acid, methacrylic acid, maleic acid, and mixtures thereof are particularly preferred. In the preparation of the polymer SP it is of course also possible to use the anhydrides of the acids, such as maleic, acrylic or methacrylic anhydride, instead of or together with the acids.

The polymer SP further contains from 0.5 to 50% by weight, preferably from 1 to 30% by weight, of at least one ethylenically unsaturated compound selected from the esters of ethylenically unsaturated monocarboxylic acids and the monoesters and diesters of ethylenically unsaturated dicarboxylic acids containing at least one hydroxyl-containing amine in copolymerized form.

The polymer SP is preferably in the form of a comb polymer having covalently bonded amine side chains.

Monocarboxylic acids suitable for the esters are the aforementioned $C_3$ to $C_{10}$ monocarboxylic acids, especially acrylic acid, methacrylic acid, and crotonic acid, and mixtures of these.

Dicarboxylic acids suitable for the monoesters and diesters are the aforementioned $C_4$ to $C_8$ dicarboxylic acids, especially fumaric acid, maleic acid, 2-methylmaleic acid, itaconic acid, and mixtures thereof.

The amine containing at least one hydroxyl group is preferably selected from secondary and tertiary amines containing at least one $C_6$ to $C_{22}$ alkyl, $C_6$ to $C_{22}$ alkenyl, aryl-($C_6$ to $C_{22}$ alkyl) or aryl-($C_6$ to $C_{22}$ alkenyl) radical, it being possible for the alkenyl group to contain 1, 2 or 3 nonadjacent double bonds.

The amine is preferably hydroxyalkylated and/or alkoxylated. Alkoxylated amines preferably have one or two alkylene oxide radicals containing terminal hydroxyl groups. The alkylene oxide radicals preferably each have from 1 to 100, more preferably from 1 to 50, identical or different alkylene oxide units, randomly distributed or in the form of blocks. Preferred alkylene oxides are ethylene oxide, propylene oxide and/or butylene oxide. Ethylene oxide is particularly preferred.

The polymer SP preferably contains in incorporated form an unsaturated compound based on an amine component which comprises at least one amine of the formula

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, it being possible for the alkenyl radical to have 1, 2 or 3 nonadjacent double bonds, $R^a$ is hydroxy-$C_1$–$C_6$ alkyl or a radical of the formula IIa

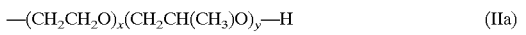

(IIa)

wherein
the sequence of the alkylene oxide units is arbitrary and x and y independently of one another are an integer from 0 to 100, preferably from 0 to 50, the sum of x and y being >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, it being possible for the alkenyl radical to contain 1, 2 or 3 nonadjacent double bonds, or $R^b$ is a radical of the formula III

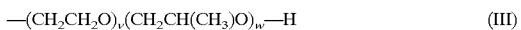

(III)

wherein
the sequence of the alkylene oxide units is arbitrary and v and w independently of one another are an integer from 0 to 100, preferably from 0 to 50.

$R^c$ is preferably $C_8$ to $C_{20}$ alkyl or $C_8$ to $C_{20}$ alkenyl, it being possible for the alkenyl radical to contain 1, 2 or 3 nonadjacent double bonds. $R^c$ is preferably the hydrocarbon radical of a saturated or monounsaturated or polyunsaturated fatty acid. Examples of preferred radicals $R^c$ are n-octyl, ethylhexyl, undecyl, lauryl, tridecyl, myristyl, pentadecyl, palmityl, margarinyl, stearyl, palmitoleyl, oleyl, and linolyl.

With particular preference the amine component comprises an alkoxylates fatty amine or an alkoxylated fatty amine mixture. The ethoxylates are particularly preferred. Use is made in particular of alkoxylates of amines based on naturally occurring fatty acids, such as tallow fatty amines, which predominantly contain saturated and unsaturated $C_{14}$, $C_{16}$ and $C_{18}$ alkylamine or cocoamines, which contain saturated, monounsaturated and diunsaturated $C_6$–$C_{22}$ alkylamines, preferably $C_{12}$–$C_{14}$ alkylamines. Amine mixtures suitable for alkoxylation are, for example, various Armeen® grades from Akzo or Noram® grades from Ceca.

Examples of suitable commercially available alkoxylated amines are the Noramox® grades from Ceca, preferably ethoxylated oleyl amines, such as Noramox® 05 (5 EO units), and also the products sold under the brand name Lutensol®FA by BASF AG.

The copolymerization of the aforementioned esters, monoesters, and diesters generally brings about pronounced stabilization of a polymer dispersion prepared in the presence of SP. The polymer dispersions of the invention retain their colloidal stability of the latex particles on dilution with water or dilute electrolytes or surfactant solutions, and do so reliably.

The esterification for preparing the above-described esters, monoesters and diesters takes place in accordance with customary techniques known to the skilled worker. To prepare esters of unsaturated monocarboxylic acids, the free acids or suitable derivatives, such as anhydrides, halides, e.g. chlorides, and $C_1$ to $C_4$ alkyl esters can be used. The preparation of monoesters of unsaturated dicarboxylic acids takes place preferably starting from the corresponding dicarboxylic anhydrides. The reaction is preferably effected in the presence of a catalyst, such as a dialkyl titanate or an acid, for example, such as sulfuric, toluenesulfonic or methanesulfonic acid. The reaction takes place generally at reaction temperatures from 60 to 200° C. In accordance with one appropriate embodiment, the reaction takes place in the presence of an inert gas, such as nitrogen. Water formed during the reaction may be removed from the reaction mixture by means of appropriate measures, such as distillation. The reaction may take place if desired in the presence of customary polymerization inhibitors. Essentially, the esterification reaction may be conducted to completion or just to a partial conversion. If desired, one of the ester components, preferably the hydroxyl-containing amine, may be used in excess. The extent of esterification may be determined by means of infrared spectroscopy.

In one preferred embodiment, the unsaturated esters, monoesters or diesters are prepared and further reacted to the polymers SP without isolation of the esters, the reactions preferably taking place in succession in the same reaction vessel.

To prepare the polymers SP it is preferred to use a reaction product of a dicarboxylic anhydride, preferably maleic anhydride, and one of the above-described hydroxyl-containing amines.

Besides the carboxylic acid and ester, monoester and/or diester constituents, the polymer SP may also contain in copolymerized form from 0 to 20% by weight, preferably from 0.1 to 10% by weight, of other monomers. Monomers which can be used are the monomers mentioned in connection with the polymer EP, particular preference being given to vinylaromatics, such as styrene, olefins, such as ethylene, or (meth)acrylates such as methyl (meth)acrylate, ethyl (meth)acrylate, n-butyl (meth)acrylate, 2-ethylhexyl (meth) acrylate, and mixtures thereof.

The polymers SP are preferably prepared by free-radical polymerization in bulk or in solution. Examples of suitable solvents for the solution polymerization are water, water-miscible organic solvents, such as alcohols and ketones, examples being methanol, ethanol, n-propanol, isopropanol, n-butanol, acetone, methyl ethyl ketone, etc., and mixtures thereof. Examples of suitable polymerization initiators are peroxides, hydroperoxides, peroxodisulfates, percarbonates, peroxo esters, hydrogen peroxide, and azo compounds, as described below in more detail for the preparation of the polymer dispersions of the invention. Where desired, the polymers SP may be prepared separately and isolated and/or purified in accordance with customary methods. Preferably, the polymers SP are prepared immediately before the preparation of the polymer dispersions of the invention and used without isolation for the dispersion polymerization.

The polymers SP may also be prepared advantageously by means of polymer-analogous reaction. For this purpose a polymer incorporating from 80 to 100% by weight of at least one ethylenically unsaturated monocarboxylic and/or dicarboxylic acid and from 0 to 20% by weight of the other polymers mentioned above can be reacted with at least one hydroxyl-containing amine.

The weight ratio of polymer EP to polymer SP, based on solids, is preferably in the range from 7:1 to 1:7, in particular from 3:1 to 1:3.

Besides the polymers EP and SP, the polymer dispersion may also contain from 0 to 50% by weight, preferably from 0.1 to 40% by weight, based on the polymer SP, of at least one surface-active, alkoxylated, preferably ethoxylated or propoxylated, alkylamine. Preferred alkylamines are the alkylamines of the formula $R^cNR^aR^b$ as defined above which are also present in the polymer SP, particular preference being given to alkylamines of the formula

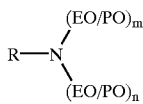

where R is an alkyl, alkenyl or alkylvinyl radical containing at least 6 carbon atoms and m and n independently of one another are $\geq 1$. Preferred radicals R have from 8 to 22 carbon atoms.

The alkoxylated alkylamines present in the polymer SP, and the additional alkylamine crosslinkers, may be the same or different compounds.

Particularly preferred compositions of the polymer dispersions contain
a) from 70 to 30% by weight of polymer EP,
b) from 30 to 70% by weight of polymer SP, and if desired
c) from 0 to 10% by weight of surface-active alkoxylated alkylamine,
d) from 0 to 20% by weight of polyol crosslinker,
e) from 0 to 5% by weight of reaction accelerator (in particular no reaction accelerator),
based on the total weight of a) to e) plus the abovementioned amount of alkoxysilane.

Further to the constituents indicated, it is possible to add customary additives depending on end application. The polymer dispersion and the polymer dispersion containing further additives are referred to collectively below as "composition".

The additional components that may be present in the composition are generally added after the end of the emulsion polymerization.

Further, the compositions may comprise customary additives depending on end application. For example, they may comprise bactericides or fungicides. They may also comprise hydrophobicizing agents for increasing the strength of the treated substrates with respect to water. Suitable hydrophobicizing agents are customary aqueous paraffin dispersions or silicones. The compositions may further comprise wetting agents, thickeners, plasticizers, retention agents, pigments, and fillers.

Finally, the compositions may comprise customary flame retardants, such as aluminum silicates, aluminum hydroxides, borates and/or phosphates, for example.

The compositions may also be used as blends with other binders, such as urea-formaldehyde resins, melamine-formaldehyde resins or phenol-formaldehyde resins, for example, and also with epoxy resins.

The compositions are preferably formaldehyde-free. Formaldehyde-free means that the compositions contain no substantial amounts of formaldehyde and also that no substantial amounts of formaldehyde are released in the course of drying and/or curing. In general, the compositions contain <100 ppm of formaldehyde. They permit the production of moldings with a short cure time, and give the moldings excellent mechanical properties.

Prior to application, the compositions are substantially uncrosslinked and therefore thermoplastic. If necessary, however, a low level of preliminary crosslinking of the polymer EP may be brought about by using, for example, monomers containing two or more polymerizable groups.

The polymer dispersion or composition may be used, for example, as a binder for fibrous and particulate substrates, such as woodchips, wood fiber, textile fiber, glass fiber, mineral fiber or natural fibers such as jute, flax, hemp or sisal, and also cork chips or sand. After curing, moldings of high mechanical strength are obtained which retain their dimensional stability even under humid conditions. Heat curing is preferred. The curing temperatures are generally from 80 to 250° C., preferably from 100 to 200° C.

On heating, the water in the composition evaporates and the composition cures. These processes may take place simultaneously or in succession. By curing in this context is meant the chemical alteration of the composition, e.g., crosslinking by formation of covalent bonds between the different constituents in the compositions, formation of ionic interactions and clusters, and formation of hydrogen bonds. Curing may also be accompanied by physical changes within the binder, such as phase transitions or phase inversions, for example. One advantage of the compositions of the invention is that they can be cured at comparatively low temperatures. The duration and temperature of heating influence the degree of cure.

Curing may also be effected in two or more stages. For example, in a first step the curing temperature and time may be chosen such that the degree of curing attained is low, and substantially complete curing takes place in a second step. This second step may take place in spatial and temporal separation from the first step. By this means, for example, it becomes possible to use the compositions of the invention to produce semifinished goods which are impregnated with binder and which may be shaped and cured at another location.

The invention further provides a bound substrate obtainable by treating a substrate with an aqueous polymer dispersion as described above and then curing it. The substrate is preferably in the form of a mold or a nonwoven (fiber web).

The moldings preferably have a density of from 0.2 to 1.4 g/cm$^3$ at 23° C.

Particularly suitable moldings are sheets and shaped parts with a contour. Their thickness is generally at least 1 mm, preferably at least 2 mm, and their surface area typically from 200 to 200 000 cm$^2$. Consideration may be given in particular to wood fiberboard and chipboard, cork boards, cork blocks and cork molds, insulant boards and insulant rolls made, for example, from mineral fibers and glass fibers, interior automotive parts, such as interior door trim, dashboards, parcel shelves, etc.

The amount by weight of the binding used is generally from 0.5 to 40% by weight, preferably from 1 to 30% by weight (binder solids), based on the substrate (fibers, slivers or chips).

The fibers, slivers or chips can be coated directly with the binder or mixed with the aqueous binder. The viscosity of the aqueous binder is adjusted preferably from 10 to 4 000 mPas, more preferably to from 30 to 2 000 mpas (DIN 53019, rotational viscometer at 250 s$^{-1}$).

The mixture of fibers, slivers and chips and the binder can be subjected to initial drying at temperatures, for example, from 10 to 150° C. and then to compression molding to form the moldings at temperatures, for example, of from 80 to 250° C, preferably from 100 to 200° C., and pressures of generally from 2 to 1 000 bar, preferably from 10 to 750 bar, with particular preference from 200 to 500 bar.

The binders are particularly suitable for producing wood-base materials such as wood chipboard and wood fiberboard (cf. Ullmanns Encyclopädie der technischen Chemie, 4$^{th}$ edition 1976, volume 12, pp. 709–727), which can be produced by gluing disintegrated wood, such as wood chips and wood fibers, for example. The water resistance of woodbase materials can be enhanced by adding to the binder a customary commercial aqueous paraffin dispersion or other hydrophobicizing agents, or adding said hydrophobicizing agents beforehand or subsequently to the fibers, slivers or chips.

Chipboard production is widely known and is described, for example, in H. J. Deppe, K. Ernst Taschenbuch der Spanplattentechnik, 2$^{nd}$ edition, Verlag Leinfelden 1982.

It is preferred to use chips whose average size is from 0.1 to 4 mm, in particular from 0.2 to 2 mm, and which contain less than 6% by weight of water. However, it is also possible to use considerably coarser chips and those with a higher moisture content. The binder is applied with great uniformity to the wood chips, the weight ratio of binder solids to wood chips preferably being from 0.02:1 to 0.3:1. Uniform distribution can be achieved, for example, by spraying the binder in finely divided form onto the chips.

The glued wood chips are then scattered out to form a layer with a highly uniform surface, the thickness of the layer being guided by the desired thickness of the finished chipboard. The scattered layer is pressed at a temperature of from 100 to 250° C., for example, preferably from 120 to 225° C., by applying pressures of usually from 10 to 750 bar, to form a board. The required press times may vary within a wide range and are generally from 15 seconds to 30 minutes.

The wood fibers of appropriate quality required to produce medium density fiberboard (MDF) panels from the binders can be produced from barkless wood chips by milling in special mills or refiners at temperatures of about 180° C.

For gluing, the wood fibers are generally swirled up in a stream of air and the binder is introduced through nozzles into the resultant fiber stream (blow-line process). The ratio of wood fiber to binder based on the dry-matter content or solids content is usually from 40:1 to 2:1, preferably from 20:1 to 4:1. The glued fibers are dried in the fiber stream at temperatures of, for example, from 130 to 180° C., scattered out to form a fiber web, and pressed under pressures of from 10 to 50 bar to form boards or moldings.

Alternatively, as described for example in DE-A-24 17 243, the glued wood fibers can be processed to a transportable fiber mat. This intermediate can then be processed further to boards or shaped parts, such as door interior trim panels of motor vehicles, for example, in a second, temporally and spatially separate step.

Other natural fiber substances as well, such as sisal, jute, hemp, flax, coconut, banana and other natural fibers, can be processed with the binders to form boards and shaped parts. The natural fiber materials can also be used in mixtures with plastic fibers, such as polypropylene, polyethylene, polyester, polyamides or polyacrylonitrile, for example. In this case the plastic fibers may also function as cobinders in addition to the binder of the invention. The proportion of plastic fibers in this case is preferably less than 50% by weight, in particular less than 30% by weight and, with very particular preference, less than 10% by weight, based on all chips, slivers or fibers. The fibers can be processed by the method used for the wood fiberboards. Alternatively, preformed natural fiber mats can be impregnated with the binders of the invention, with or without the addition of a wetting auxiliary. The impregnated mats, in the binder-moist or predried state, are then pressed at temperatures from 100 to 250° C. under pressures of from 10 to 100 bar, for example, to form boards or shaped parts.

The substrates impregnated with the binders of the invention preferably have a residual moisture content on pressing of from 3 to 20% by weight, based on the substrate to be bound.

The moldings obtained feature low water absorption, low thickness swell after storage in water, and good strength, and are formaldehyde-free.

In addition, the compositions can be used as binders for coating materials and impregnating materials for boards made of organic and/or inorganic fibers, nonfibrous mineral fillers, and starch and/or aqueous polymer dispersions. The coating and impregnating materials impart a high flexural modulus to the boards. The production of such boards is known.

Boards of this kind are commonly used as soundproofing panels. The thickness of the panels is usually within the range from about 5 to 30 mm, preferably in the range from 10 to 25 mm. The edge length of the square or rectangular panels is usually in the range from 200 to 2 000 mm.

In addition, the compositions of the invention may include the auxiliaries customary in coating and impregnating technology. Examples of such auxiliaries are finely divided inert fillers, such as aluminum silicates, quartz, precipitated or pyrogenic silica, light and heavy spar, talc, dolomite or calcium carbonate; color pigments, such as titanium white, zinc white, black iron oxide, etc., foam inhibitors, such as modified dimethylpolysiloxanes, and adhesion promoters, and also preservatives.

The components of the composition are generally present in the coating material in an amount of from 1 to 65% by weight. The proportion of the inert fillers is generally from 0 to 85% by weight, the proportion of water being at least 10% by weight.

The compositions are employed in a customary manner by application to a substrate, for example, by spraying, rolling, pouring or impregnating. The amounts applied, based on the dry-matter content of the composition, are generally from 2 to 100 g/m$^2$.

The amounts of additives to be used are known to the skilled worker and are guided in each individual case by the desired properties and the intended application.

The compositions can also be used as binders for insulating materials made from inorganic fibers, such as mineral fibers and glass fibers. Insulating materials of this kind are produced industrially by spinning melts of the corresponding mineral raw materials; see U.S. Pat. Nos. 2,550,465, 2,604,427, 2,830,648, EP-A-354 913 and EP-A-567 480. The composition is then sprayed onto the freshly produced, still hot inorganic fibers. The water then largely evaporates and the composition remains, in essentially uncured form, adhering as a viscous mass to the fibers. A continuous, binder-containing fiber mat produced in this way is transported on by means of appropriate conveyor belts through a curing oven. In the oven, the mat cures at temperatures in the range from about 100 to 200° C. to form a rigid matrix. After curing, the mats of insulating material are processed appropriately.

The predominant fraction of the mineral fibers or glass fibers used in the insulating materials has a diameter in the range from 0.5 to 20 μm and a length in the range from 0.5 to 10 cm.

The compositions are further suitable as binders for fiber webs.

Examples of fiber webs that may be mentioned are webs of cellulose, cellulose acetate, esters and ethers of cellulose, cotton, hemp, animal fibers, such as wool or hair, and, in particular, webs of synthetic or inorganic fibers, examples being aramid, carbon, polyacrylonitrile, polyester, mineral, PVC, or glass fibers.

In the case of use as binders for fiber webs, the compositions of the invention may include, for example, the following additives: silicates, silicones, boron compounds, lubricants, wetting agents.

Preference is given to glass fiber webs. The unbonded fiber webs (untreated fiber webs), especially of glass fibers, are bound, i.e., consolidated, by the binder of the invention.

For this purpose the binder is applied to the untreated fiber web by means, for example, of coating, impregnating or soaking preferably in a weight ratio of fiber to binder (solids) of from 10:1 to 1:1, with particular preference from 6:1 to 3:1.

In this case the binder is used preferably in the form of a diluted aqueous formulation containing 95 to 40% by weight of water.

Application of the binder to the untreated fiber web is generally followed by drying at, preferably, from 100 to 400° C., in particular from 130 to 280° C., with very particular preference from 130 to 230° C., over a period of preferably from 10 seconds to 10 minutes, in particular from 10 seconds to 3 minutes.

The bonded fiber web obtained has high strength in the dry and wet states. In particular, the binders of the invention permit short drying times and also low drying temperatures.

The bonded fiber webs, especially glass fiber webs, are suitable for use as or in roofing membranes, as base materials for wallpapers, or as inliners or base material for floor coverings made, for example, from PVC.

For use as roofing membranes, the bonded fiber webs are generally coated with bitumen.

The aqueous compositions can also be used to produce foamed boards or moldings. For this purpose the water present in the composition is first of all removed down to a level of <20% by weight at temperatures of <100° C. The viscous composition thus obtained is then foamed at temperatures >100° C., preferably from 120 to 300° C. Examples of blowing agents which can be used are the residual water still present in the mixture and/or the gaseous reaction products that form in the course of the curing reaction. However, commercially customary blowing agents can also be added. The resultant crosslinked polymer foams can be used, for example, for heat insulation and for soundproofing.

The compositions can also be used to produce laminates, for decorative applications, for example, by impregnating paper and then carrying out gentle drying, in accordance with the known processes. In a second step, these laminates are laminated onto the substrate to be coated, under pressure and with heat, the conditions being chosen such that curing of the binder takes place.

In addition, the compositions can be used to produce sandpaper and other abrasives by the production techniques customarily carried out with phenolic resin binders. In the production of sandpapers, a layer of the binders of the invention is first of all applied (appropriately 10 g/m$^2$) as base binder to an appropriate backing paper. The desired amount of particulate abrasive, for example, silicon carbide, corundum, etc., is scattered into the wet base binder. After initial drying, a binder topcoat is applied (e.g., 5 g/m$^2$). The paper coated in this way is then cured by heating at 170° C. for another 5 minutes.

The hardness and flexibility of the composition may be set to the desired level by way of the composition of the polymer SP.

The compositions of the invention are suitable, furthermore, as formaldehyde-free sand binders for producing casting molds and cores for metal casting according to conventional thermal hardening processes (E. Flemming, W. Tilch, Formstoffe und Formverfahren, Dt. Verlag für Grundstoffindustrie, Stuttgart, 1993).

They are also suitable as binders for mold insulating boards.

The nonlimiting examples which follow illustrate the invention.

EXAMPLES

A): Preparation of the Acid Polymer SP

A pressure reactor with anchor stirrer is charged with 0.55 kg of fully deionized water, 0.36 kg of maleic anhydride and 0.91 kg of a 40% strength by weight aqueous solution of an ethoxylated oleylamine (average degree of ethoxylation=12, from BASF AG). This initial charge was heated to 125° C. under a nitrogen atmosphere. After this temperature has been reached, feed stream 1 consisting of 0.75 kg of fully deionized water and 1.00 kg of acrylic acid is metered in a uniform rate over the course of 4 h and feed stream 2 consisting of 0.22 kg of fully deionized water and 0.12 kg of $H_2O_2$ (30% by weight) is metered in at a uniform rate over the course of 5 h. Following the end of feed stream 1, a further 0.11 kg of fully deionized water are added. After the end of the reaction the reaction mixture is cooled to room temperature. The aqueous polymer solution obtained in this way has a solids content of 43.2%, a pH of 1.7 and a viscosity of 450 mPas. The K value is 13.3.

B) Polymer Dispersions (emulsion polymerisation in the presence of the acid polymer and alkoxysilane)

Polymer dispersion with EP1:

640 g of water, 133.1 g of an aqueous solution of the acid polymer SP (43.2% by weight) from example A, 5.35 g (10%) of feed stream 2 and 5.75 g of silane (Witco A-1100 silane) are charged to a 4 l glass vessel with anchor stirrer (120 rpm) and heated to 90° C. After 10 minutes, the remainder of feed stream 1 is added at this temperature, over the course of 3 h, and the remainder of feed stream 2 is added over the course of 3.5 h, the two additions taking place in spatial separation from one another. Polymerization is then continued at this temperature for 30 minutes after which the reaction mixture is cooled and blended with feed stream 3. The polymer dispersion prepared in this way has a nonvolatiles content of 47.3% by weight and a pH of 2.7. The viscosity of the resultant polymer dispersion is 630 mpas (at 250 s$^{-1}$). Finally, 9% of triethanolamine (based on the solids content) is added to the dispersion.

| Feed stream 1: | | |
|---|---|---|
| 185.32 g | of water | |
| 665.51 g | of SP | (43.2%) |
| 28.75 g | of gamma-aminopropyltrimethoxysilane (A-1100, Witco) | (100%) |
| 805.00 g | of styrene | (100%) |
| 287.50 g | of MMA | (100%) |
| 57.50 g | of HEA | (100%) |
| Feed stream 2: | | |
| 50 g | of fully deionized water | |
| 3.45 g | of sodium peroxodisulfate | |
| Feed stream 3: | | |
| 1863.43 g | of SP | (43.2%) |
| 80.50 g | of A1100 silane | |

Polymer disperion with EP2:

Regime as for EP 1 but with different feed stream compositions

| Feed stream 1: | | |
|---|---|---|
| 185.32 g | of water | |
| 2528.94 g | of SP | (43.2%) |
| 109.25 g | of silane | (100%) |
| 805.00 g | of styrene | (100%) |
| 287.50 g | of MMA | (100%) |
| 57.5 g | of HEA | (100%) |

No feed stream 3 (all SP and silane in feed stream 1)

Feed stream 2:

50 g of fully deionized water
3.45 g of sodium peroxodisulfate
pH=2.7
viscosity (mPas at 250 s$^{-1}$)=510 mPas
SC=47.5

Polymer dispersion with EP3:
As for EP 1 with change only to feed stream 2

| Feed stream 2 | | |
|---|---|---|
| 185.32 g | of water | |
| 665.51 g | of SP | (43.2%) |
| 28.75 g | A-1100 silane | (100%) |
| 845.25 g | of EHA | (100%) |
| 241.50 g | of styrene | (100%) |
| 63.25 g | of HEA | (100%) |

Comparative Examples

In the comparative examples, alkoxysilane was added either after the end of the emulsion polymerization (experiments 3a, b and c) or not at all (experiment 1).

TABLE

Compositions:

| | |
|---|---|
| Acid polymer SP: | 56% by weight acrylic acid |
| | 24% by weight maleic acid |
| | 20% by weight ethoxylated oleylamine |
| Emulsion polymer EP 1 and EP 2 | 70% by weight styrene |
| | 25% by weight methyl methacrylate (MMA) |
| | 5% by weight hydroxyethyl acrylate (HEA) |
| EP 3: | 73.5% by weight ethylhexyl acrylate |
| | 21% by weight styrene |
| | 5.5% by weight hydroxyethyl acrylate |

The SP:EP ratio was always 1:1 (solids)

C) Performance Tests 300 g of quartz sand H34 were mixed with the binder compositions at room temperature (5% by weight or 3% by weight of dry binder as per the table, relative to sand). The moist mixtures are shaped in a corresponding metal mold into test speciments (Fischer bars) measuring 17×2.3×2.3 cm, which are compacted and then, after demolding, are cured in a circulating air oven for 2 hours at temperatures in accordance with the table. Compaction is carried out using a ram of type PRA from Georg Fischer AG. Prior to testing, the bars are stored in hot water at 80° C. for 3 hours. The water absorption of the still-wet bars is then measured (in the table, WA after WS).

The bending strength of the Fischer bars thus produced is determined in the dry state at a specimen temperature of 23° C. in a strength testing apparatus type PFG with the test device PBV (from Georg Fischer, Schaffhausen, CH) (in the table, BS after WS).

| Experiment | Silane | Amount [%] | EP | Binder amount [%] | WA after WS % by weight | BS after WS N/cm$^2$ | Notes |
|---|---|---|---|---|---|---|---|
| 1 | none | | EP 1 | 3 | 13 | 60 | 2 h cure, 170° C. |
| 2 | none | | EP 1 | 5 | 13 | 70 | 2 h cure, 170° C. |
| 3 | none | | EP 2 | 5 | 13 | 70 | 2 h cure, 170° C. |
| 4 | none | | EP 3 | 5 | n.d. | disintegrated | 2 h cure, 170° C. |

| Experiment | Silane | Amount [%] | EP | Binder amount [%] | WA after WS | BS after WS | Notes |
|---|---|---|---|---|---|---|---|
| 1 | gamma-Aminopropyltri-methoxysilane | 2 | EP 1 | 5 | 18 | 475 | 2 h cure, 170° C. |
| 2 | gamma-Aminopropyltri-methoxysilane | 4 | EP 2 | 5 | 11 | 820 | 2 h cure, 170° C. |
| 3 | gamma-Aminopropyltri-methoxysilane | 6 | EP 1 | 5 | 10 | 960 | 2 h cure, 170° C. |
| 4 | gamma-Aminopropyltri-methoxysilane | 10 | EP 2 | 5 | 10 | 880 | 2 h cure, 170° C. |
| 5 | Mercaptopropyltrimeth-oxysilane | 2 | EP 1 | 5 | 13 | 615 | 2 h cure, 170° C. |

| Experiment | Silane | Amount [%] | EP | Binder amount [%] | WA after WS | BS after WS | Notes |
|---|---|---|---|---|---|---|---|
| 1 | Octyltriethoxy-silane | 1 | EP 1 | 5 | 8 | 525 | 2 h cure, 170° C. |
| 2 | Methyltrimethoxy-silane | 1 | EP 2 | 5 | 6 | 645 | 2 h cure, 170° C. |
| 3 | beta-(3,4-Epoxycyclo-hexyl)ethyltri-methoxysilane | 1 | EP 1 | 5 | 12 | 700 | 2 h cure, 170° C. |
| 4 | gamma-Aminopropyl-trimethoxysilane | 1 | EP 1 | 5 | 10 | 970 | 2 h cure, 170° C. |
| 5 | N-(beta-Aminoethyl)-gamma-aminopropyl-trimethoxysilane | 1 | EP 2 | 5 | 14 | 670 | 2 h cure, 170° C. |
| 6 | Triaminoorgano-functional silane | 1 | EP 1 | 5 | 11 | 810 | 2 h cure, 170° C. |
| 7 | gamma-Isocyanato-propyltriethoxy-silane | 1 | EP 2 | 5 | 19 | 560 | 2 h cure, 170° C. |

| Experiment | Silane | Amount [%] | EP | Binder amount [%] | WA after WS | BS after WS | Notes |
|---|---|---|---|---|---|---|---|
| 1 | gamma-Aminopropyl-trimethoxysilane | 1 | EP 1 | 3 | 18 | 680 | 2 h cure, 170° C. |
| 2 | gamma-Aminopropyl-trimethoxysilane | 1 | EP 1 | 5 | 13 | 790 | 2 h cure, 170° C. |
| 3 | gamma-Aminopropyl-trimethoxysilane | 5 | EP 1 | 3 | 8 | 830 | 2 h cure, 170° C. |
| 4 | gamma-Aminopropyl-trimethoxysilane | 5 | EP 1 | 5 | 6 | 1250 | 2 h cure, 170° C. |
| 7 | gamma-Aminopropyl-trimethoxysilane | 2 | EP 2 | 5 | 9 | 980 | 2 h cure, 170° C. |
| 8 | gamma-Aminopropyl-trimethoxysilane | 4 | EP 2 | 5 | 9 | 920 | 2 h cure, 170° C. |
| 11 | gamma-Aminopropyl-trimethoxysilane | 2 | EP 3 | 5 | 17 | 130 | 2 h cure, 170° C. |
| 12 | gamma-Aminopropyl-trimethoxysilane | 4 | EP 3 | 5 | 18 | 160 | 2 h cure, 170° C. |

| Experiment | Silane | Amount [%] | Acrodur | Binder amount [%] | WA after WS | BS after WS | Notes |
|---|---|---|---|---|---|---|---|
| 1 | gamma-Aminopropyl-trimethoxysilane | none | EP 1 | 3 | 22 | 20 | 2 h cure, 130° C. |
| 2 | gamma-Aminopropyl-trimethoxysilane | 1 | EP 1 | 3 | 22 | 110 | 2 h cure, 130° C. |
| 3 | gamma-Aminopropyl-trimethoxysilane | 2 | EP 1 | 3 | 22 | 105 | 2 h cure, 130° C. |
| 4 | gamma-Aminopropyl-trimethoxysilane | none | EP 1 | 3 | 16 | 60 | 2 h cure, 150° C. |

-continued

| Experiment | Silane | Amount [%] | Acrodur | Binder amount [%] | WA after WS | BS after WS | Notes |
|---|---|---|---|---|---|---|---|
| 5 | gamma-Aminopropyl-trimethoxysilane | 1 | EP 1 | 3 | 18 | 360 | 2 h cure, 150° C. |
| 6 | gamma-Aminopropyl-trimethoxysilane | 2 | EP 1 | 3 | 19 | 360 | 2 h cure, 150° C. |

We claim:

1. A process for preparing an aqueous polymer dispersion, comprising:

an emulsion polymer;

a polymer comprising at least 5% by weight of an ethylenically unsaturated monocarboxylic acid, dicarboxylic acid or dicarboxylic anhydride; and an alkoxysilane of the formula:

$$SiR^1R^2R^3R^4$$

wherein the groups $R^1$–$R^4$ independently of one another are each an organic radical with the proviso that at least one of the groups is an alkoxy group, which comprises:

preparing said emulsion polymer by emulsion polymerization of the reacting monomers of the emulsion polymer in the presence at at least a portion of the alkoxysilane.

2. The process as claimed in claim 1, wherein said alkoxysilane is added to the emulsion polymerization medium before 70% by weight of the monomers which constitute the emulsion polymer have undergone polymerization.

3. The process as claimed in claim 1, wherein the emulsion polymer is comprised of at least 40% by weight of principal monomers selected from the group consisting of $C_1$–$C_{20}$ alkyl(meth)acrylates, vinyl esters of carboxylic acids containing up to 20 carbon atoms, vinyl aromatics having up to 20 carbon atoms, ethylenically unsaturated nitriles, vinyl halides, vinyl ethers of alcohols containing 1 to 10 carbon atoms, aliphatic hydrocarbons having from 2 to 8 carbon atoms and 1 or 2 double bonds, and mixtures thereof.

4. The process as claimed in claim 1, wherein the emulsion polymerization takes place in the presence of at least a portion of said acid polymer component.

5. The process as claimed in claim 4, wherein said acid polymer is comprised of:

from 50–99.5% by weight of at least one ethylenically unsaturated monocarboxylic acid or dicarboxylic acid, dicarboxylic anhydride or mixtures thereof, from 0.5–50% by weight of at least one ethylenically unsaturated compound selected from the group consisting of esters of ethylenically unsaturated monocarboxylic acids and the monoesters and diesters of ethylenically unsaturated dicarboxylic acids with an amine containing at least one hydroxyl group, and optionally, up to 20% by weight of at least one additional monomer.

6. The process as claimed in claim 1, wherein the weight ratio of emulsion polymer to acid polymer in the dispersion ranges from 7:1 to 1:7.

7. The process as claimed in claim 1, wherein the solubility of the acid polymer in water is more than 10 g/l at 25° C.

8. The process as claimed in claim 1, wherein said at least one alkoxy group of $R^1$–$R^4$ is a $C_1$–$C_8$-alkoxy group.

9. The process as claimed in claim 1, wherein at least two of the groups $R^1$–$R^4$ are alkoxy groups.

10. The process as claimed in claim 1, wherein the amount of alkoxysilane in the dispersion ranges from 0.1–10 parts by weight per 100 parts by weight of the sum of the emulsion polymer and acid polymer.

11. The process as claimed in claim 10, wherein said amount of alkoxysilane ranges from 0.2–5 parts by weight.

12. The process as claimed in claim 2, wherein said alkoxysilane is added to the polymerization medium before 50% by weight of the monomers are polymerized.

13. The process as claimed in claim 5, wherein said carboxylic acids are $C_3$–$C_{10}$ monocarboxylic acids and $C_4$–$C_8$ dicarboxylic acids.

14. The process as claimed in claim 5, wherein the aqueous polymer dispersion further comprises a polyol or alkanolamine containing at least two hydroxyl groups.

* * * * *